2,945,908
ISOMERIZATION PROCESS AND CATALYST THEREFOR

Harrison M. Stine, Lyndhurst, and James L. Callahan, Bedford, Ohio, assignors to The Standard Oil Company, Cleveland, Ohio, a corporation of Ohio No Drawing. Filed Dec. 30, 1955, Ser. No. 556,449

6 Claims. (Cl. 260—683.65)

This invention relates to a process of isomerizing $C_5$, $C_6$, $C_7$ alkanes and light petroleum naphtha which comprises these hydrocarbons. The invention also relates to a catalyst for isomerizing the abovementioned hydrocarbons.

The octane rating, and the volume of gasoline consumed, have steadily increased over the past few years and all indications point to the continuance of these trends. Much of the improvement in octane number has come from the reforming of heavy naphthas, which are more readily converted to aromatics of high octane number.

Light naphtha, however, which contains from 10 to 50% by volume of normal alkanes of 5, 6 and 7 carbon atoms, is not so readily upgraded in octane number. Light petroleum naphtha has an octane rating in the range of 60 to 70 and the normal paraffin content which is low in octane number is largely responsible for this low octane rating. Light petroleum naphtha boils within the range of 50 to 250° F. and a typical inspection is included later.

Since it is difficult to aromatize these relatively lower molecular weight hydrocarbons and since petroleum naphtha comprises a significant portion of the crude yield, it is desirable to upgrade light petroleum naphtha by conversion of the normal alkanes to hydrocarbons of higher octane number. Isomerization of these normal paraffins is a desirable method for upgrading the octane rating since the iso paraffins all have higher octane ratings than the normal paraffins. If it were possible also to dehydrogenate to form olefins, this would be desirable since straight chain olefins have higher octane numbers than the corresponding straight chain paraffins and branched chain olefins have higher octane numbers than the corresponding branched chain paraffins.

Because isomerization reaction rates are slow at temperatures below which thermal decomposition occurs, a catalyst is required if an isomerization process, accompanied or not by dehydrogenation, is to be economical.

It has now been discovered that a catalyst formed from the mixed wet gels of an alumina-silica gel and a chromia gel which is subsequently dried and processed in a conventional manner, promotes isomerization of the $C_5$–$C_7$ normal alkanes and increases the octane number of light petroleum naphtha containing the same, accompanied to some extent by dehydrogenation and/or aromatization depending upon the hydrogen partial pressure, and at the same time without undesirable cracking reactions. Undue amounts of cracking of light naphtha must be avoided since such cracked products will largely be $C_4$ and lighter which are unavailable for inclusion in gasoline. This is to be contrasted with the treatment of heavy naphtha where cracking is not so serious because, for instance, the conversion of normal decane to pentane and pentene is not necessarily a loss because both of these reaction products can be used as components of gasoline.

The mixed wet gel catalyst of my invention comprises alumina in an amount of 60 to 90 mole percent, silica in an amount of 5 to 35 mole percent, and 5 to 35 percent chromia. The catalyst is prepared by coprecipitating alumina and silica as a slurry which is filter pressed to form a filter cake. The chromia is similarly precipitated as a gel and filtered to form a filter cake. The alumina-silica and chromia wet filter cakes are then mixed and the resulting mixture dried and heat treated along conventional lines.

The catalyst of the invention will be further illustrated by the following example which comprises the best mode contemplated of carrying out the invention. It should be understood, however, that this example is given for purposes of illustration and that the invention is not limited thereto.

Example I

Two hundred and seventy eight grams of $Al_2O_3.3H_2O$, 174 grams of NaOH and 300 ml. of water were mixed and heated in a nickel crucible. The solution was then poured into ice water and diluted to one liter. Forty-two grams 40 Bé. $Na_2Si_4O_9$ solution and 250 cc. 12 N acetic acid (diluted to 10 liters) were fed into a Büchner funnel at such a rate that the silica and alumina were co-precipitated at a pH of 7. The slurry was aged for 24 hours and filter pressed until a fairly clear residue liquid resulted. The cakes were then washed with 40 gallons of water.

One hundred and eleven grams of $Cr(C_2H_3O_2)_3.H_2O$, 100 cc. of 12 N $HC_2H_3O_2$ and a liter of water were mixed, aged for three days, and diluted to 10 liters with water. Chromic oxide was precipitated continuously at a pH of 10.0–10.5 by mixing with a stream of 1 N NaOH. The $Cr_2O_3$ precipitate was aged overnight, filter pressed and washed with 30 gallons of water. The silica-alumina and chromia wet filter cakes were then mixed through a colloid mill with 2 cc. of acetic acid being added to the slurry. The resulting mixture was dried at 200° F. for 24 hours and heat treated in air at 950°–1000° F. for an additional 24 hours. The catalyst was pelleted. It had the following molal composition: $18Cr_2O_3$—$10SiO_2$—$72Al_2O_3$.

In carrying out the isomerization process in accordance with this invention, temperatures ranging from 700 to 1050° F. and preferably from 850 to 950° F. may be used. The process also may be conducted at pressures from 0 to 750 lbs. per square inch guage. Hourly space velocities, meaning the liquid volume of hydrocarbon feed per hour per volume of catalyst, may be in the range of ½ to 5, preferably in the range of 1 to 3. The reaction may be carried out in the presence of hydrogen in amounts from 0 to 5 moles of hydrogen per mole of hydrocarbon. Expressed in terms of partial pressure of hydrogen, the amount may be 0 to 625 pounds per square inch. Under these circumstances and using the novel catalyst of this invention, it is possible to convert a substantial amount of the normal alkanes to iso-alkanes and improve the F-1 clear octane numbers of light naphtha.

After a period of service, the catalyst may lose some of its activity as a result of carbon deposition. Regeneration may be accomplished readily by passing air or an oxygen-containing gas thereover in order to burn the deposits from the catalyst. Regeneration temperatures may not exceed about 1100° F. without impairing the catalyst activity.

The process of the invention may be effected in any suitable equipment; especially suitable is the use of the fixed bed process in which the catalyst is deposited in a reaction zone or zones, the hydrocarbon passing through such zone or zones in contact with the catalyst. Another suitable apparatus is the fluid type in which the catalyst is suspended by the upwardly moving gaseous hydrocarbon stream. After reforming, the products may be fractionated to separate excess hydrogen and to recover the desired fractions of isomerized product.

The isomerization process will be further illustrated in the following examples which describe the best mode contemplated for carrying out the invention, it being understood that the invention as defined herein is not limited to such illustrative examples.

Example II

Normal pentane was treated with the catalyst of Example I under the conditions and with the results shown in the following table:

| | |
|---|---|
| Feed | Normal pentane. |
| Temperature | 950° F. |
| Space velocity | 1 v.v.h. |
| $H_2$/HC ratio | 3 moles. |
| Pressure | 500 p.s.i. |
| Iso-pentanes produced | 15%. |
| Yield of liquid products | 71%. |
| Olefins | 2%. |

Inasmuch as normal pentane has a blending octane number of 62, and iso-pentane has a blending octane number of 99, the process is able to achieve a substantial increase in octane value without too great a loss. Since normal and iso-pentane have a difference of about 15° F. in their boiling points they can be readily separated by distillation, if desired, and the normal pentane recycled to the process.

Example III

The same catalyst was employed in the reforming of light naphtha which has the following inspection:

| | |
|---|---|
| Kattwinkel No. | 8.0 |
| Bromine No. | 1.13 |
| Octane No. | 65.7 |
| Engler distillation, I.B.P. ° F. | 126 |
| Percent over: | |
| 5 ° F. | 152 |
| 10 ° F. | 158 |
| 20 ° F. | 165 |
| 30 ° F. | 172 |
| 40 ° F. | 179 |
| 50 ° F. | 186 |
| 60 ° F. | 193 |
| 70 ° F. | 200 |
| 80 ° F. | 209 |
| 90 ° F. | 222 |
| 95 ° F. | 243 |
| E.P. ° F. | 249 |

The reforming conditions and the results are as follows:

| | Example IIIa | Example IIIb | Feed |
|---|---|---|---|
| Temperature °F. | 980 | 950 | |
| Feed Rate v.v.h. | 1 | 1 | |
| $H_2$ Partial Pressure p.s.i. | 240 | 0 | |
| Yield | 44.6 | 90.0 | |
| Octane Number | 94.0 | 80.5 | 65.7 |
| Kattwinkel No. | 54 | 38 | 8.0 |
| Bromine No. | 2.0 | 21.8 | 1.3 |

These results show an increase in octane number which must be attributed to a large extent to the isomerization of normal paraffins in the feed stock. The lower yield in Example IIIa shows that the hydrogen has caused considerable hydrocracking and this suggests that the optimum yield-octane relationship would be obtained at a hydrogen partial pressure of from 0 to 150 p.s.i. when isomerizing a light naphtha of the type described. The effect of the hydrogen on dehydrogenation is significant. In Example IIIa the high Kattwinkel number and low bromine number indicates considerable aromatization and little olefin formation. In Example IIIb the high bromine number shows considerable olefin formation along with the isomerization and much less aromatization.

It is intended to cover all changes and modifications in the examples of the invention, herein given for purposes of illustration, which do not constitute departure from the spirit and scope of the appended claims.

We claim:

1. A process for isomerizing a $C_5$–$C_7$ normal alkane, which comprises contacting the same with a catalyst consisting essentially of the dried and heat treated mixed wet gels of alumina-silica and chromia in the proportions of 60–90 mol percent alumina, 5–35 mol percent silica and 5–35 mol percent chromia obtained by (1) effecting the co-precipitation of silica and alumina, filtering the same and washing the filter cake; (2) effecting the precipitation of chromia, filtering the same and washing the filter cake; (3) mixing the silica-alumina and chromia filter cakes, drying the mixture and heat treating the same; said contacting taking place at a temperature of from 700 to 1050° F., and at a pressure from atmospheric to 750 pounds per square inch gauge, to convert a substantial amount of said normal alkane to iso-alkanes.

2. A process for isomerizing a $C_5$–$C_7$ normal alkane, which comprises contacting the same with a catalyst consisting essentially of the dried and heat treated mixed wet gels of alumina-silica and chromia in the proportions of 72 mol percent alumina, 10 mol percent silica and 18 mol percent chromia obtained by (1) effecting the co-precipitation of silica and alumina, filtering the same and washing the filter cake; (2) effecting the precipitation of chromia, filtering the same and washing the filter cake; (3) mixing the silica-alumina and chromia filter cakes, drying the mixture and heat treating the same; said contacting taking place at a temperature of from 850 to 980° F., and at a pressure from atmospheric to 750 pounds per square inch gauge, to convert a substantial amount of said normal alkane to iso-alkane.

3. The process of claim 2 in which the normal alkane is contained in light naphtha.

4. The process of claim 3 in which the contacting is done at a temperature of 950° F. in the absence of hydrogen.

5. The process of claim 3 in which the contacting is done at a temperature of 980° F. and at a hydrogen partial pressure of 240 pounds per square inch.

6. The process of claim 2 in which the normal alkane is pentane, and the contacting is done at a temperature of 950° F., at a pressure of 500 pounds per square inch and at a hydrogen to pentane ratio of 3 moles.

References Cited in the file of this patent

UNITED STATES PATENTS

| | | |
|---|---|---|
| 2,317,803 | Reeves et al. | Apr. 27, 1943 |
| 2,381,825 | Lee et al. | Aug. 7, 1945 |
| 2,670,321 | Morrell | Feb. 23, 1954 |
| 2,718,535 | McKinley et al. | Sept. 20, 1955 |
| 2,735,801 | Gutzeit | Feb. 21, 1956 |

FOREIGN PATENTS

| | | |
|---|---|---|
| 487,392 | Canada | Oct. 21, 1952 |

UNITED STATES PATENT OFFICE

CERTIFICATE OF CORRECTION

Patent No. 2,945,908                   July 19, 1960

Harrison M. Stine et al.

It is hereby certified that error appears in the printed specification of the above numbered patent requiring correction and that the said Letters Patent should read as corrected below.

Column 1, line 16, for "peroleum" read -- petroluem --; column 2, line 1, after "35", second occurrence insert -- mole --.

Signed and sealed this 27th day of December 1960.

(SEAL)
Attest:
KARL H. AXLINE

Attesting Officer

ROBERT C. WATSON
Commissioner of Patents